United States Patent [19]

Hirsch

[11] 3,875,528

[45] Apr. 1, 1975

[54] PSEUDO-INDEPENDENT NOISE GENERATOR

[75] Inventor: Jean-Jacques Hirsch, Echirolles, France

[73] Assignee: Societe Generale de Constructions Electriques et Mecaniques (Alsthom), Paris, France

[22] Filed: Feb. 12, 1973

[21] Appl. No.: 331,472

[30] Foreign Application Priority Data

Feb. 11, 1972 France .............................. 72.04778

[52] U.S. Cl. .................................................. 331/78
[51] Int. Cl. .......................................... H03b 29/00
[58] Field of Search ........................ 331/78; 307/221

[56] References Cited

UNITED STATES PATENTS

| | | | |
|---|---|---|---|
| 3,761,696 | 9/1973 | Russell | 331/78 |
| 3,777,278 | 12/1973 | Majean | 331/78 |

*Primary Examiner*—John Kominski
*Attorney, Agent, or Firm*—Craig & Antonelli

[57] ABSTRACT

Generator of noises which are pseudo-independent from one another, characterized in that the noises other than the original noise are drawn off from shift registers supplied by disjunction operators receiving certain of the bits from another register of the generator.

5 Claims, 2 Drawing Figures

PSEUDO-INDEPENDENT NOISE GENERATOR

The invention concerns the generating of pseudo-independent noises, which may be used more particularly for coding stochastically represented data.

The stochastic representation of data consists in representing that data by the probability that one or several uncertain or pseudo-uncertain logic signal(s) assume one of two logic states.

To code data by stochastic display methods, a comparator receiving, at the input, on the one hand, the data to be coded, and on the other hand, an uncertain or pseudo-uncertain noise, is used.

It is a known technique to produce a pseudo-uncertain noise by means of a negative-reaction or feedback type shift register, and to obtain, from such a pseudo-uncertain noise source, by time shifting, other pseudo-independent noises, these consequently being suitable for use for coding several data items by means of pseudo-independent binary variable quantities, a condition which is generally necessary for the use of operators in stochastic representation, for the method consisting in using the same noise for coding various data items and effecting a shift in time at the output of the coding comparators reduces the accuracy of the calculations.

But that time shifting of the noises obtained from a common source is very expensive to effect, for the signal shifts bear on each of the bits of the noise, and it is necessary to effect signal shifts which are sometimes appreciable to ensure the exactitude of the result of the operations.

It has been found, according to the invention, that it was possible to produce, on registers an uncertain or pseudo-uncertain original noise and, from that original noise, at least another pseudo-independent noise, without having to install shift devices, by drawing off that other pseudo-independent noise from a shift register fed by a disjunction operator receiving certain of the bits of another of the said registers.

Indeed, it is always possible to obtain a delayed version $x_1(t-\tau)$ of a stage of a register, by means of a linear function in disjunction operators of certain of the stages $x_1(t)$ to $x_n(t)$ of that register.

With reference to the accompanying diagrammatic drawings, an example of an embodiment of the invention will be given by way of an illustration having no limiting character.

Figure 1:
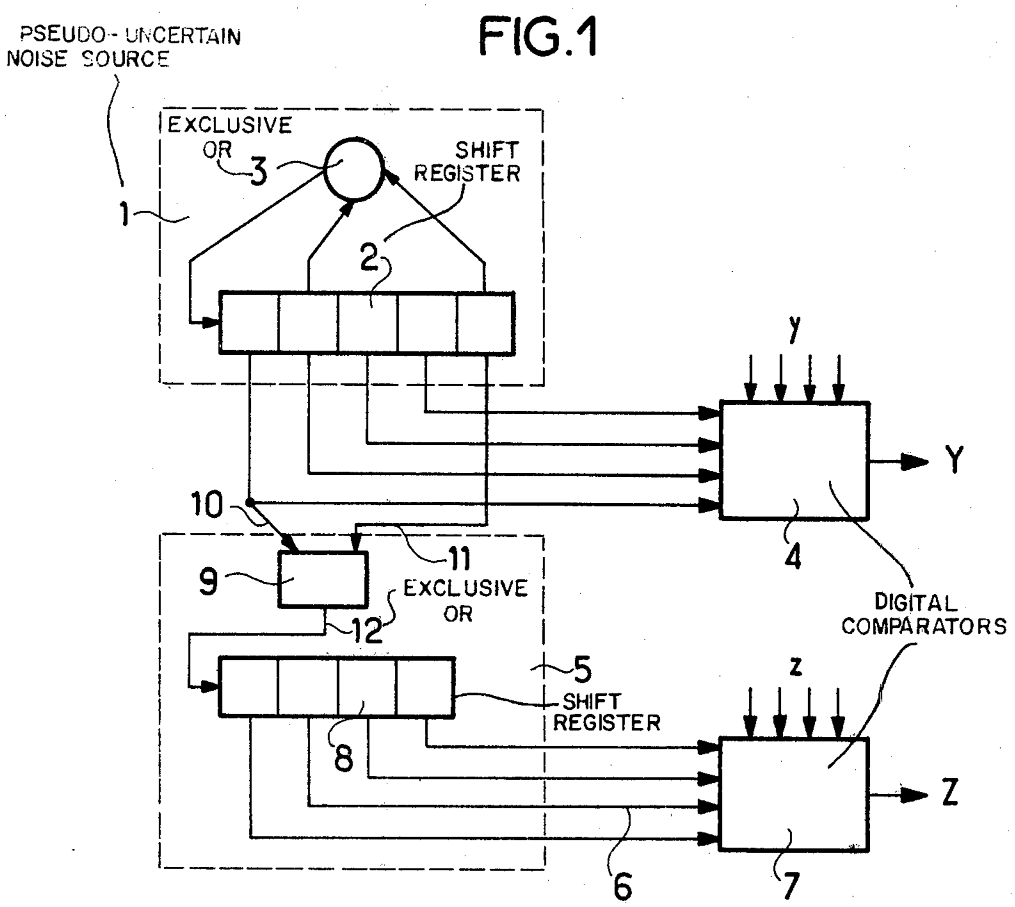
FIG. 1 is a schematic diagram of a noise generator.

With reference to FIG. 1, 1 is a source of pseudo-uncertain noise, the type described, for example, in FIG. 5 on page 292 of "The Proceedings of the Spring Joint Computer Conference, April, 1964,"(A.F.I.P.S, Conference Proceedings, Volume 25).038749826 The source 1 is constituted by a negative reaction type shift register 2 controlled by means of a disjunction or exclusive or element 3.

It has been supposed, in that example, that this shift register 2 comprised five stages, that the negative reaction produced by feedback defined the following relation: $x_1(t) = x_1(t-2) \oplus x_1(t-5)$ between a bit $x_1$ at the instant t and the bit of the same stage at the instants $t-2$ and $t-5$, and that four of the five bits of that register were used in the coding of a magnitude $y$ as a stochastic representation $\gamma$, that coding being effected in a comparator 4.

The assembly 5 enables a pseudo-independent noise which may be used for coding a magnitude $z$ as a stochastic representation Z in a comparator 7 to be obtained at 6 from the noise produced in the register 2. That assembly 5 is composed of a shift register 8 used for storing the noise, fed by a disjunction element 9 receiving certain of the bits from the register 2.

It has been assumed that it was required to obtain, at 6, a delayed version $x_1(t-10)$.

Due to the negative reaction of the register 2, the result obtained is:

$$x_1(t) = x_1(t-2) \oplus x_1(t-5)$$
$$x_1(t-5) = x_1(t-7) \oplus x_1(t-10)$$
$$x_1(t-2) = x_1(t-4) \oplus x_1(t-7)$$

whence:

$$x_1(t) = x_1(t-4) \oplus x_1(t-7) \oplus x_1(t-7) \oplus x_1(t-10)$$

and $$x_1(t-10) = x_1(t) \oplus x_1(t-4).$$

The disjunction element 9 must therefore have two inputs 10 and 11, connected to stages of the register 2 shifted by four steps in space. The output 12 of that element is connected to the input of the shift register 8.

If there is need of other pseudo-independent noises, other assemblies such as 5, whose disjunction element 9 receives certain bits from the register 2, chosen according to the retarded version of the original noise which is required to be obtained, are installed. The disjunction element 9 of these new assemblies 5 could also receive the bits, not from the register 2, but from another register 8 on which a greater number of stages than that (four, in the example chosen) necessary for coding the data could then be provided.

It would also be possible to combine the producing of certain noises according to the invention, with the producing of other noises by shifting in time according to the known method.

Figure 2:
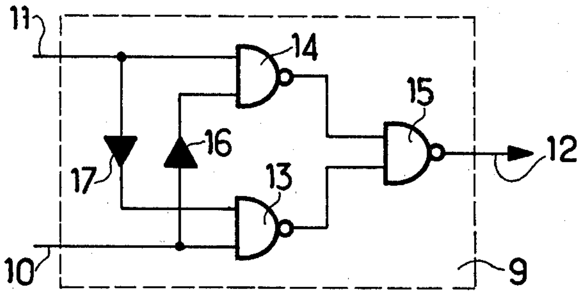
FIG. 2 is a circuit diagram of a disjunction element used in that generator.

FIG. 2 shows the configuration of the disjunction element 9. It consists of three "NAND" gates 13, 14 and 14, and two invertors 16 and 17, giving the complementary bit.

In a general way, a version delayed by $\tau$ of a bit $x_1$ is given by a formula such as the following:

$$x_1(t-\tau) = \lambda_1 x_1(t) \oplus \lambda_2 x_1(t-1) \oplus \ldots \oplus \lambda_n x_1(t-n)$$

where the coefficients $\tau_1$ to $\tau_n$ have the value 0 or 1.

That sequence of disjunctions is effected by means of a disjunction operator consisting of elements such as that in FIG. 2 placed one after another, one of the inputs of a disjunction element being the output of the preceding element and the other input being connected to a stage of the register used for feeding the disjunction operator.

In that example, it has been supposed that the original noise source was a shift register of the negative reaction type but the invention is independent from the uncertain or pseudo-uncertain original noise source used.

What is claimed is:

1. A pseudo-independent noise generator in which an uncertain or pseudo-uncertain original noise is produced by a first shift register connected to a first disjunction operator circuit, the first shift register feeding a first comparator to which data to be coded is also applied, means for generating at least one other pseudo-independent noise comprising a second disjunction operator circuit connected to selected stages of said first shift register, a second shift register having its input connected to said second disjunction operator circuit and a second comparator connected to said second shift register and receiving data to be coded.

2. A pseudo-independent noise generator as defined in claim 1 wherein said first and second shift registers are negative reaction shift registers.

3. A pseudo-independent noise generator as defined in claim 1 wherein said first shift register is a five stage shift register, the first and fifth stages of said first shift register being connected to said second disjunction operator circuit.

4. A pseudo-independent noise generator as defined in claim 3 wherein said second disjunction operator circuit comprises first and second NAND gates, one input of said second disjunction operator circuit being connected to an input of said first NAND gate and a second input of said second disjunction operator circuit being connected to an input of said second NAND gate, a first inverter connected between said one input of said second disjunction operator circuit and a second input of said second NAND gate, a second inverter connected between said second input of said second disjunction operator circuit and a second input of said first NAND gate, a third NAND gate having respective inputs connected to the outputs of said first and second NAND gates, the output of said third NAND gate serving as the output of said second disjunction operator circuit.

5. A pseudo-independent noise generator as defined in claim 4 wherein said first and second shift registers are negative reaction shift registers.

* * * * *